UNITED STATES PATENT OFFICE.

JOHN VALENTINE CLARKE, OF SEVEN KINGS, ENGLAND.

PROCESS FOR SEPARATING THORIUM FROM OTHER RARE EARTHS AND FOR THE MANUFACTURE OF THORIUM NITRATE AND OTHER THORIUM SALTS.

1,335,482.  Specification of Letters Patent.  Patented Mar. 30, 1920.

No Drawing.  Application filed September 28, 1918. Serial No. 256,096.

*To all whom it may concern:*

Be it known that I, JOHN VALENTINE CLARKE, a subject of His Majesty the King of Great Britain, and resident of Seven Kings, Essex, England, have invented a certain new and useful Improvement in Processes for Separating Thorium from other Rare Earths and for the Manufacture of Thorium Nitrate and other Thorium Salts, of which the following is a specification.

This invention relates to an improved process for separating thorium from other rare earths and for the manufacture of thorium salts, and particularly thorium nitrate and has reference to processes in which the separation is effected by precipitation from acid solutions, and the present invention consists broadly in effecting the precipitation by the addition to the acid solution of a reagent which will give a precipitate directly soluble in acid. The invention further consists of the particular process by which thorium peroxid is precipitated by means of an oxidizing agent and then dissolved in nitric acid or other acid, for the production of thorium nitrate, or other salts of thorium.

In carrying the invention into practice according to one method we take monazite sand, which contains various rare earth metals—notably thorium and cerium—and subject it to the usual breaking process with sulfuric acid. The resulting mass is then put into water and a solution of rare earth phosphates in sulfuric acid thus obtained. This solution is then treated with an oxidizing agent such as potassium or sodium permanganate, or hydrogen peroxid, for instance, with the result that the thorium contained in the solution is precipitated as an oxid or thorium probably being mostly, if not entirely, thorium peroxid, the precipitate thus obtained can then be filtered off and dissolved in nitric acid for the production of nitrate or treated in any known manner.

A practical example of the carrying out of the process is as follows:—20 grams of monazite sand are digested or broken with 50 grams of concentrated sulfuric acid at a temperature of approximately 180° to 200° C., until the resultant pasty mass is soluble in water, with the exception of the unattacked portion of the mineral, which is chiefly composed of compounds of silicon, zirconium and the like. This operation usually takes about two hours.

The pasty mass is then slowly added to 200 c. m. of water at normal temperature and allowed to stand for some time, preferably over night, to allow the insoluble matter to settle.

The solution is then decanted or siphoned off and a slight excess of a weak solution of sodium, or potassium permanganate is added, the quantity required being determined by the occurrence of a permanent discoloration of the liquid.

The solution is then gently heated to about 90° C. when the thorium is precipitated as an oxid or more probably a mixture of oxids and peroxids. Great care must be taken in this operation not to raise the temperature too rapidly, for a gelatinous precipitate will be formed which is very difficult to separate and wash.

The precipitate is then filtered and washed free from cerium and acid. The wash water is best tested by litmus—not ammonium molybdate in acid solution—for there is usually a trace of sulfuric acid after washing free from phosphoric acid.

This precipitate is soluble in nitric acid and to obtain the nitrate it is dissolved in nitric acid preferably about a 50% solution. The thorium nitrate can be crystallized out in the usual way but we prefer to evaporate the solution down to crystallizing point *in vacuo*.

The thorium nitrate may not be absolutely pure. If it is desired to obtain pure thorium nitrate, this may be obtained by a reprecipitation by the addition to the nitrate solution of the reagent originally employed, or according to another method the nitrate solution may be treated with sodium carbonate in excess whereby thorium carbonate is obtained and the excess sodium carbonate re-dissolves the thorium carbonate leaving the impurities in the precipitate so that after filtration a solution of pure thorium carbonate is obtained. The thorium carbonate is then precipitated from the solution by the addition of caustic soda and the resulting precipitate of thorium hydroxid is filtered off and dissolved in nitric acid when subsequent crystallization will give pure thorium nitrate crystals.

What I claim and desire to secure by Letters Patent is:—

1. The improved process for the separation of thorium from other rare earth metals according to which thorium is precipitated from a mineral acid solution by the addition to the solution of an oxidizing agent whereby a precipitate of an oxid or oxids of thorium directly soluble in nitric acid is obtained.

2. The improved process for the production of thorium salts according to which thorium is precipitated as oxid or peroxid from a mineral acid solution containing thorium by the addition to the solution of an oxidizing agent, and the precipitate is then dissolved in nitric acid or other suitable acid and crystallized.

3. The improved process for the production of thorium nitrate from monazite sand according to which the monazite sand is first subjected to the usual breaking process with sulfuric acid, the resulting mass is then treated with water and a solution of rare earth phosphates in sulfuric acid thus obtained, the solution is then treated with an oxidizing agent and thorium peroxid precipitate obtained which is subsequently filtered off and dissolved in nitric acid.

4. The process for the production of thorium nitrate according to claim 2 wherein crystallization is effected *in vacuo*.

In testimony whereof I affix my signature.

JOHN VALENTINE CLARKE.